United States Patent [19]

Akiyama

[11] 4,098,165
[45] Jul. 4, 1978

[54] MUSIC STUDYING DEVICE

[76] Inventor: Kakunosuke Akiyama, 1-1-7-301, Sakuratsutsumi, Musashino-shi, Tokyo-to, Japan

[21] Appl. No.: 715,835

[22] Filed: Aug. 19, 1976

[51] Int. Cl.² ............................................. G09B 15/04
[52] U.S. Cl. ............................................................ 84/470
[58] Field of Search ................. 84/470, 471, 472, 477, 84/483, 484

[56] References Cited

U.S. PATENT DOCUMENTS

| 2,946,254 | 7/1960 | Hauser | 84/471 |
| 3,256,765 | 6/1966 | Siegel | 84/470 X |
| 3,382,750 | 5/1968 | Hiyama | 84/471 |
| 3,429,217 | 2/1969 | Lawrence | 84/471 |
| 3,460,425 | 8/1969 | Kiepe | 84/470 |
| 3,562,394 | 2/1971 | Kiepe | 84/470 |

Primary Examiner—Lawrence R. Franklin
Attorney, Agent, or Firm—Biebel, French & Nauman

[57] ABSTRACT

A device for studying music concepts, in which, a teaching sheet having a musical staff entered therein is set under a transparent plate having transparent conductive films disposed corresponding to the lines and inter-line spaces of said staff of said teaching sheet, and by teaching a specific scale note of the staff with a conductive contact bar, a corresponding sound may be produced. Thus music pupils learn through their eyes and ears by means of this device.

By using this device in combination with an overhead projector, group studies may be made effectively in a school room.

Further, the teaching sheet and transparent plate may have certain patterns of musical instruments for studying playing positions.

7 Claims, 7 Drawing Figures

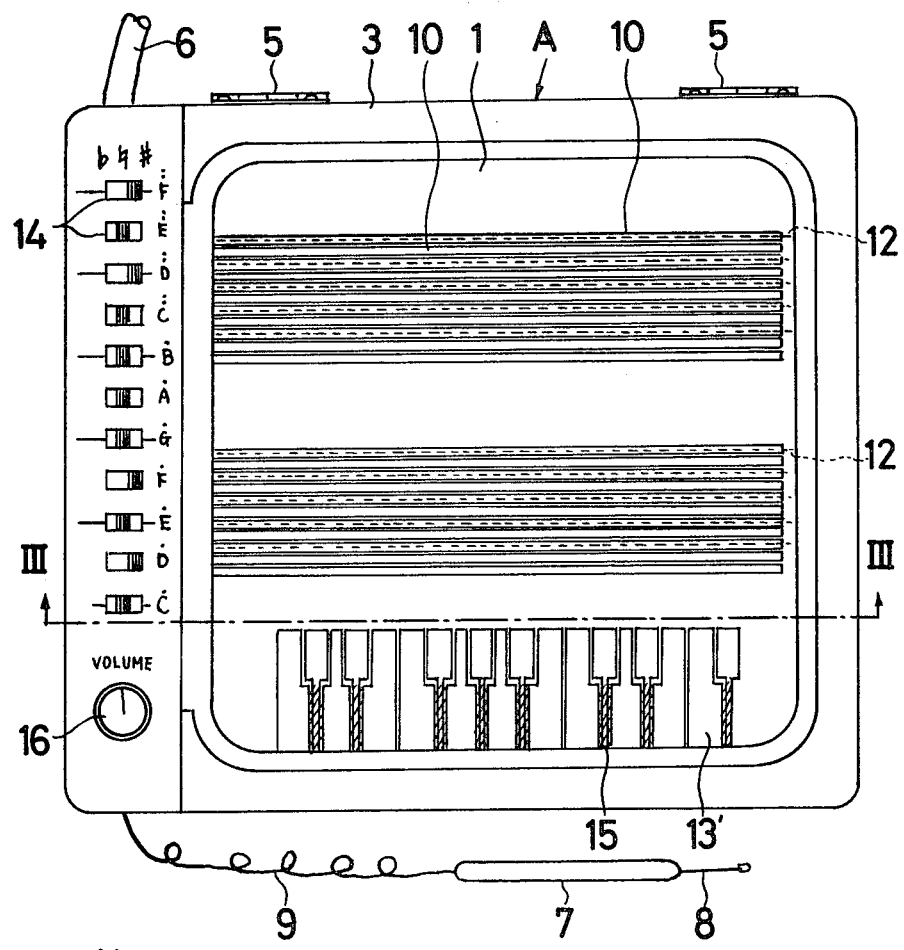
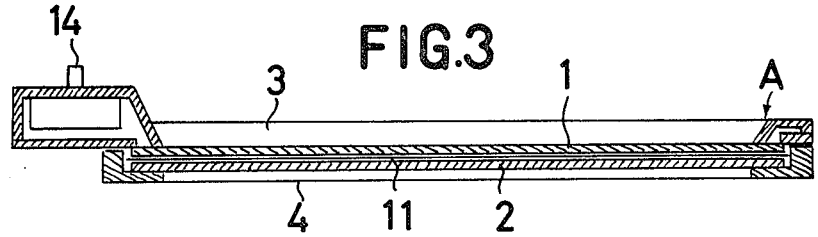

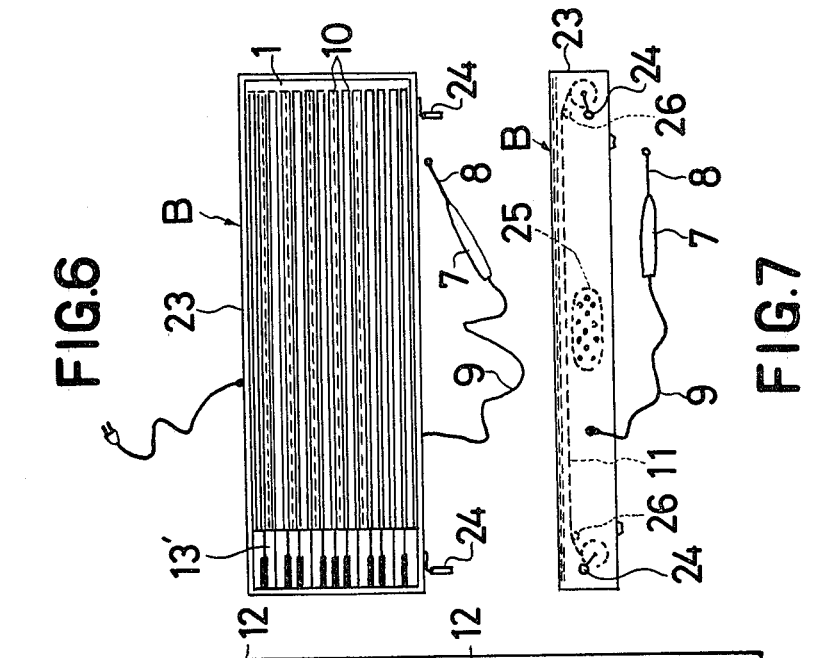
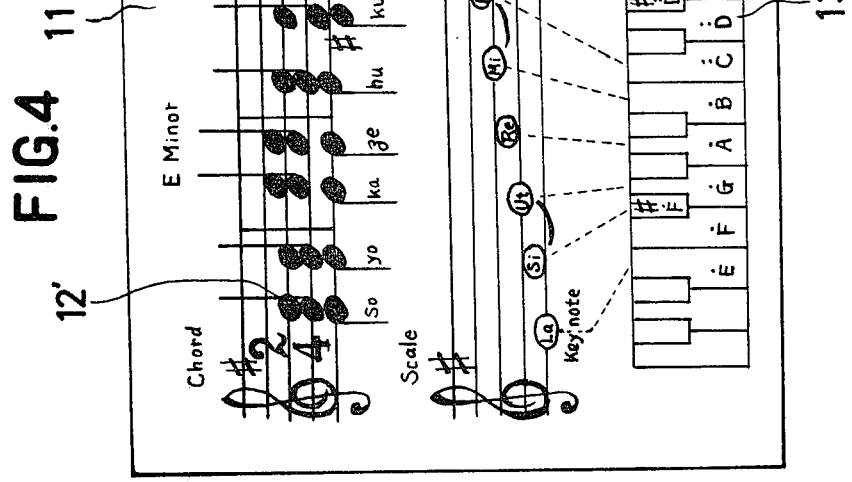
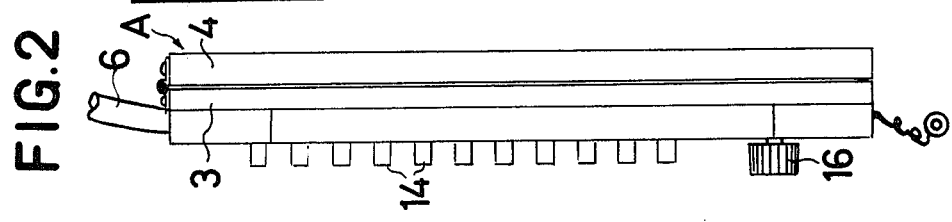

MUSIC STUDYING DEVICE

BACKGROUND OF THE INVENTION

The present invention relates to a music studying device, which is effective in helping beginners to learn music concepts through their eyes and ears.

In the past, a sound making blackboard has been used for a similar purpose, wherein lines and inter-line spaces of the musical staff are entered into the board with conductive material and connected to an electric apparatus, and by touching specific lines or spaces with a contact bar, sounds of a corresponding tone are produced from a speaker.

However, in the device of such kind, large electric patterns must be laid over the board, and this may raise the cost of the apparatus. Besides that, it has some disadvantage of not being portable.

Further, as the music must be written by chalk on the board prior to the lesson, the teacher must erase the music used for the previous lesson, then enter new music for his own lesson.

This may waste time for the teacher, and the more the use of the board increases, the more the teacher's load may increase.

Moreover, chalk powder laid on the board, which is non-conductive, prevents electrical contacts of contact bar, and may cause troubles.

SUMMARY OF THE INVENTION

Accordingly, an object of the present invention is to provide a music studying device which can be made in a compact and portable form, easy to handle and carry, and in which such disadvantages as mentioned above are removed.

The above and related objects may be readily attained in a device comprising; a teaching sheet member with a musical staff entered therein; a transparent plate member having conductive films fixed thereon, said films being pervious to light and disposed corresponding to lines and inter-line spaces of said staff of teaching sheet member; and a contact bar means; said contact bar means and each of said conductive films being connected to an audio-frequency oscillating circuit or signal switching circuit, either directly or indirectly. The circuit is adapted to produce sounds corresponding to each of the scale notes in said staff when said films are overlapped to corresponding lines and inter-line spaces of said staff and said contact bar means is brought into contact with each of said films above said staff.

Thus the device is an aural and visual aid for studying music concepts, is very easy to handle and carry, and when this device is used in combination with an overhead projector, studies may be effectively made in a group in a class room. It may be used conveniently for learning music personally at home, even when the projector is not being used.

In a preferred embodiment of the invention, the transparent plate member further comprises patterns of the operational parts of certain musical instruments, such as keys of a piano, consisting of conductive material, so that studies may be made in connection with the operation of musical instruments.

These and other objects and advantages of the present invention will be apparent from the following description, the accompanying drawings and the appended claims.

BRIEF DESCRIPTION OF THE DRAWINGS

FIG. 1 is a plan view of one embodiment of the device of the present invention;

FIG. 2 is a right side elevation of the device shown in FIG. 1;

FIG. 3 is a sectional front view taken along line III—III of FIG. 1;

FIG. 4 is a plan view of one example of teaching sheet member;

FIG. 6 is a plan view of another embodiment of the device of the present invention; and FIG. 7 is a front view of the device shown in FIG. 6.

DESCRIPTION OF THE PREFERRED EMBODIMENTS

Figure 5:
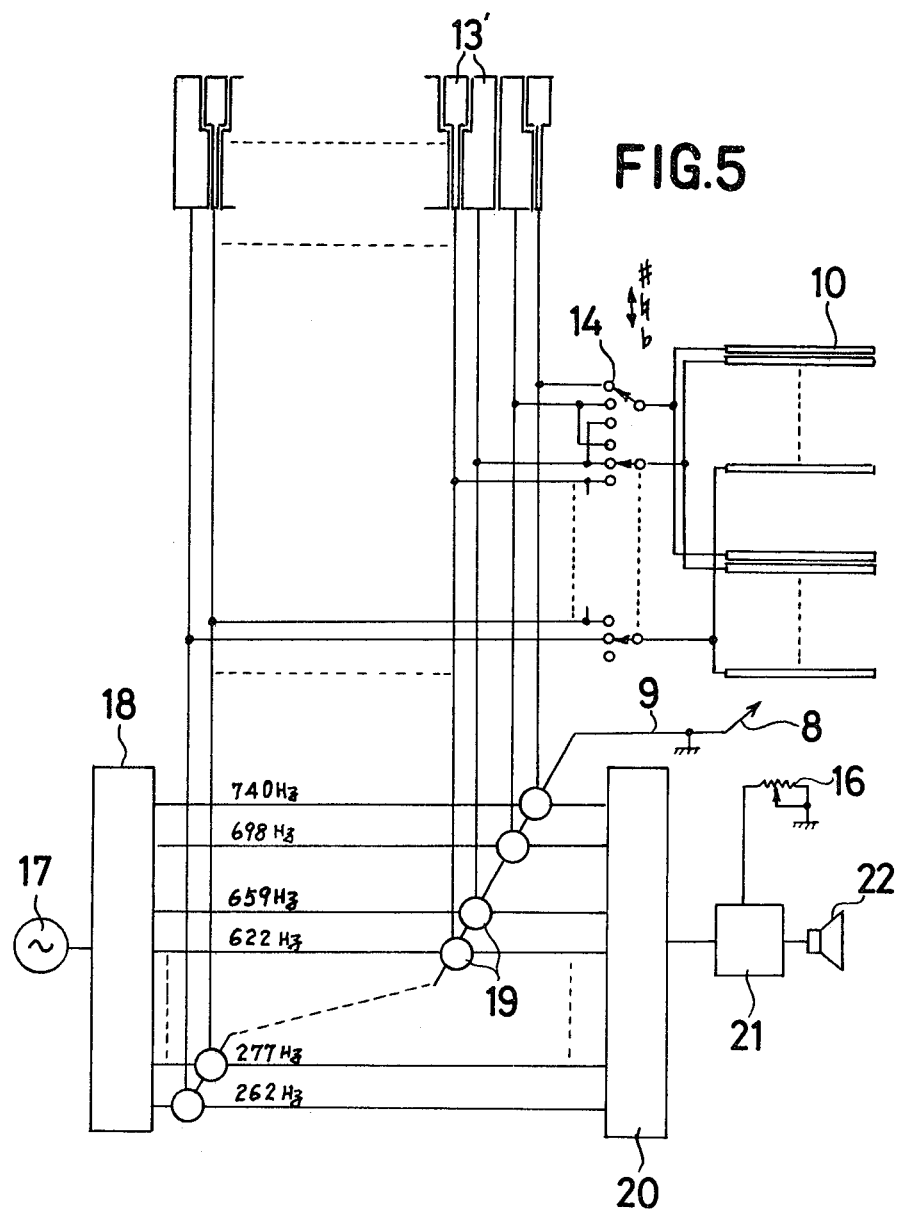
FIG. 5 is a schematic diagram of electric circuit used in the device shown in FIG. 1.

In the drawings, like members are indicated by similar numbers.

Referring now to the drawings, a music studying device A shown in FIGS. 1 through 3 comprises an upper plate 1 and a lower plate 2, each made of glass, plastics or a like transparent and insulating material and held in upper and lower frames 3 and 4, respectively. Frames 3 and 4 are hinged at 5, so that plate 1 can be opened and can hold a teaching sheet 11 between plate 1 and plate 2 when closed.

Teaching sheet 11 is a transparent film or like sheet material provided with a musical staff 12, and preferably some patterns of piano keys 13, either by drawing or printing, as shown in FIG. 4.

Meanwhile, the outer surface of the upper plate 1 is provided with certain conductive films 10, which are pervious to light and disposed corresponding to lines and inter-line spaces of the staff 12 of teaching sheet 11, thus laterally extending stripe-like transparent patterns are formed on the plate 1. Piano key patterns 13', which correspond to key patterns 13 of sheet 11, are also provided on plate 1 with film of the same material as film 10.

In case the plate 1 is a plastic material, conductive films 10 and key patterns 13' may be formed on the plate be depositing such metals as tin or indium by means of the vacuum evaporation method, thereafter removing unnecessary parts by a photo-etching process.

Glazing of similar metallic material may be used in case the plate 1 is glass. Films 10 and patterns 13' are very thin and scarcely visible.

As shown in FIG. 4, teaching sheet 11 further may have scale notes 12' on the staff 12 which indicate some music or a melody. They may be previously printed on the sheet, or entered into the staff when the sheet is brought into use.

Sheet 11 is about 25cm × 25cm square, and can be fit between plates 1 and 2. A rolled form sheet may be also used, which is adapted to slide between plates 1 and 2.

In either case, conductive films 10 and key patterns 13' coincide with staff 12 and key patterns 13 of teaching sheet 11 respectively, when the sheet 11 is set under the plate 1.

In the drawing, 8 is a contact bar with insulating handle 7 and connecting wire 9.

Conductive films 10, key patterns 13' and contact bar 8 are connected to an electric apparatus with a multi-core cable 6. Each film 10 is connected to a corresponding key pattern 13' through tone changing switch 14 (FIGS. 1 and 5) which is shown at the left side of upper frame 3 of FIG. 1. The middle position of the switch 14 corresponds to natural tones, while right and left positions correspond to sharp and flat tones, respectively.

In FIG. 1 15 is an insulation material covered on each lead line of the black key patterns, and 16 is a volume controller which is shown under switch 14.

FIG. 5 shows a diagram of a circuit used in the device in which numeral 17 indicates a main oscillator adapted to produce signals of several hundred KHz, and 18 is a frequency divider consisting of a digital circuit and dividing the signals from oscillator 17 to plural audio frequency signals each required by the corresponding piano key; these signals are separately introduced to gate or signal switching circuits 19. Each key pattern 13' is introduced to a corresponding gate circuit 19 by a control line, and this line is also connected to the corresponding conductive film 10 through tone changing switch 14. Meanwhile, contact bar 8 is connected to a common line of gate circuit 19 by connecting wire 9.

By touching the film 10 or key pattern 13' with contact bar 8, the corresponding gate circuit operates and passes the signal to amplifier 21 through a mixing circuit 20, and produces sound from speaker 22.

By touching the key patterns 13' with the fingers while gripping the conductive part of contact bar 8 with other hand, the apparatus may also produce sounds. In these plural contacts, plural signals from different gate circuits 19 are mixed at mixing circuit 20.

Gate control voltage on the conductive films 10 and key patterns 13' is extremely low, so that it is not hazardous to the human body. It is preferable, however, to ground the common line 9 for assurance of safety and reliability of the apparatus.

The device may be used together with an overhead projector now commonly used in the school room, in which a transparent sheet with some teaching material entered therein is placed on the stageplate of the projector, and by shining the light from below, an enlarged figure of the material may be projected on the screen or the wall.

In using device A, the same is mounted on the stageplate of the projector, which has a similar size of 25cm × 25cm, and the light is shined from below, then the enlarged figures of staff 12 and key patterns 13 in teaching sheet 11 are projected on the screen. Films 10 or key patterns 13' on upper plate 1 do not prevent the projection of figures, as they are pervious to light.

When the teacher points at specific notes 12' of staff 12 with contact bar 8, the corresponding sound may be produced, and at the same time, the shadow of contact bar 8 is also projected on the screen and shows the position of note 12'.

He can also make music by touching key patterns 13' with his fingers, and at the same time, the shadow of the fingers shows the key position.

Thus the pupils in the school room can learn the music through their eyes and ears, and this is a very effective way of studying music concepts.

These kinds of devices may be built into the projector. In this case, lower plate 2 may be omitted.

Another form of the electric circuit may be also used, in which, plural oscillators are provided, each adapted to oscillate at a specific frequency and connected to each conductive film 10 or key pattern 13' directly or through a tone changing switch.

In another form of the circuit, each film 10 or key pattern 13' is connected to one oscillator through a resister or like frequency determining element.

In the teaching sheet of 25cm × 25cm size, 27 notes ranging from A flat (207 Hz) to A sharp (932 Hz) can be entered and three staves 12 may be also provided in this sheet.

FIGS. 6 and 7 show another embodiment of the present invention, which may be conveniently used for learning music personally at home. In this device B, the plate 1 having conductive films 10 and teaching or learning sheet 11 of rolled form having scores entered therein are contained in a box 23. When in use, the box 23 may be placed on a desk or the like, and the pupil can learn the music through his ears and eyes in the similar way as aforementioned, and he can move the sheet 11 from one side to the other by winding the roll with handle 24 to reveal a new score on the upper surface.

Paper or the like material may be used for the teaching sheet. In the drawing, 25 is a speaker and 26 are guide rollers for the sheet. Key patterns 13' are also provided on one side of plate 1 drawn with conductive paint or like material, each key pattern 13' is insulated with each other and connected to the corresponding film 10, so that the pupil can also practice piano by touching the key patterns 13' with reference to the scores.

It is apparent from the foregoing description, that the device according to the present invention is very easy to handle and carry, as well as it is very useful because music concepts can be studied through the eyes and ears concurrently, and it is not only convenient for learning music personally at home, but also can be used effectively for studying music in a group in a school room when it is used in combination with an overhead projector.

What is claimed is:
1. a device for studying music comprising:
   (a) a teaching sheet member with a musical staff entered therein,
   (b) a transparent plate member overlying said teaching sheet member, said plate member having conductive films fixed thereon, said films being pervious to light and disposed corresponding to the lines and inter-line spaces of said staff of said teaching sheet member,
   (c) a contact bar means,
   (d) an audio-frequency electronic circuit adapted to produce sounds corresponding to each scale of notes in said staff, and
   (e) said contact bar means and each of said conductive films being connected to said audio-frequency electronic circuit to produce sounds corresponding to each of said scale notes in said staff when said contact bars means is brought into contact with each of said films above said staff.
2. The device of claim 1 wherein:
   (a) said teaching sheet member is transparent.
3. The device of claim 1 wherein:
   (a) said transparent plate further comprising patterns of an operational part of a musical instrument, said patterns consisting of conductive material.
4. The device of claim 3 wherein:
   (a) said teaching sheet member has patterns of said operational part of musical instrument corresponding to said patterns in said transparent plate member.
5. The device of claim 1 wherein:
   (a) said teaching sheet member is square.
6. The device of claim 1 wherein:
   (a) said teaching sheet member is in a rolled form and adapted to move from one side to the other under said transparent plate member.
7. The device of claim 1 further comprising switch means for raising and lowering the tone provided by any one line or inter-line space by one-half note.

* * * * *